United States Patent [19]

Eckert

[11] 4,366,789

[45] Jan. 4, 1983

[54] PISTON-TYPE INTERNAL COMBUSTION ENGINE

[75] Inventor: Konrad Eckert, Stuttgart, Fed. Rep. of Germany

[73] Assignee: Robert Bosch GmbH, Stuttgart, Fed. Rep. of Germany

[21] Appl. No.: 239,948

[22] Filed: Mar. 3, 1981

[30] Foreign Application Priority Data

Mar. 3, 1980 [DE] Fed. Rep. of Germany ....... 3008124

[51] Int. Cl.³ ............................................. F02B 19/16
[52] U.S. Cl. .................................. 123/263; 123/285; 123/661
[58] Field of Search ............... 123/262, 263, 269, 661, 123/285

[56] References Cited

U.S. PATENT DOCUMENTS

| | | | |
|---|---|---|---|
| 2,504,036 | 4/1950 | Morrison | 123/262 |
| 2,952,250 | 9/1960 | Henry-Biaband | 123/263 X |
| 4,000,722 | 1/1977 | May | 123/263 |
| 4,094,272 | 6/1978 | May | 123/263 X |
| 4,121,544 | 10/1978 | May | 123/263 X |
| 4,166,436 | 9/1979 | Yamakawa | 123/263 X |
| 4,300,498 | 11/1981 | May | 123/263 |
| 4,331,115 | 5/1982 | May | 123/263 |

FOREIGN PATENT DOCUMENTS

| | | | |
|---|---|---|---|
| 2235842 | 1/1974 | Fed. Rep. of Germany | 123/262 |
| 64775 | 12/1955 | France | 123/262 |

Primary Examiner—Tony M. Argenbright
Attorney, Agent, or Firm—Edwin E. Greigg

[57] ABSTRACT

A piston-type internal combustion engine is proposed which has externally-supplied ignition and in which fuel is injected, from the direction of the intake tube, past the opened inlet valve directed into a partial combustion chamber of disc-like embodiment, the bottom or top of which is defined, respectively, by the surface area of the piston substantially by the valve plate of the inlet valve. As the result of the injection of the fuel in the last portion of the intake stroke and the spin formation in the compressed charge with the aid of guided squeeze flows, a layering of the charge is attained, which improves the ignitability and the speed of complete combustion of the operational mixture introduced into the combustion chamber, with low intake and transfer losses.

7 Claims, 6 Drawing Figures

PISTON-TYPE INTERNAL COMBUSTION ENGINE

BACKGROUND OF THE INVENTION

The invention is based on a piston-type internal combustion engine in which the ignitability and speed of complete combustion of the operating fuel-air mixture is improved. In an internal combustion engine of this kind, known from German disclosure document DE-OS No. 27 57 648, the intention is to attain an increase in the compression ratio during knock-free operation in order to improve efficiency. By layering the charge, the operation of the engine with an operating mixture with the least possible fuel component is made possible. This layering is made possible, in particular, by means of the injection of fuel into the partial combustion chamber of the engine from a point located in the intake tube, and at a time which is at the end of the opening phase of the inlet valve. The layering is reinforced by means in the intake tube which create a spin, as a result of which the charge introduced therein is set into rotation, and the layering is also reinforced by a slight constriction of the connecting cross section between the partial combustion chamber and the rest of the combustion chamber.

The spin-generating means, however, have the disadvantage that they cause a throttling of the intake air, which reduces the possible extent of filling, and that after the charge has been ignited, during the expansion stroke, losses occur in the course of transmitting the charge into the chamber being formed as the result of the movement of the piston out of this location. As a result, the specific output of the engine is reduced.

OBJECT AND SUMMARY OF THE INVENTION

The piston-type internal combustion engine according to the invention and having the characteristics of the main claim has the advantage over the prior art that the formation of spin in the partial combustion chamber is substantially promoted with the aid of a directed squeeze flow. A more intense spin is attainable than in the case of a spin built into the intake tube, because this latter spin-forming means has a negative effect on the extent of charge or filling of the engine.

Thus, in combination with the specialized manner of fuel delivery, it is possible to attain better layering with increasing turbulence, as a result of which the efficiency or consumption in turn is improved. The high turbulence causes an increase in complete burning speed, and this in turn makes it possible to increase the compression ratio during knock-free operation or to add an increased amount of exhaust gas to the operational mixture for the purpose of lowering the emission of toxic substances.

The invention will be better understood and further objects and advantages thereof will become more apparent from the ensuing detailed description of two preferred embodiments taken in conjunction with the drawings.

DESCRIPTION OF THE PREFERRED EMBODIMENTS

Figure 1:
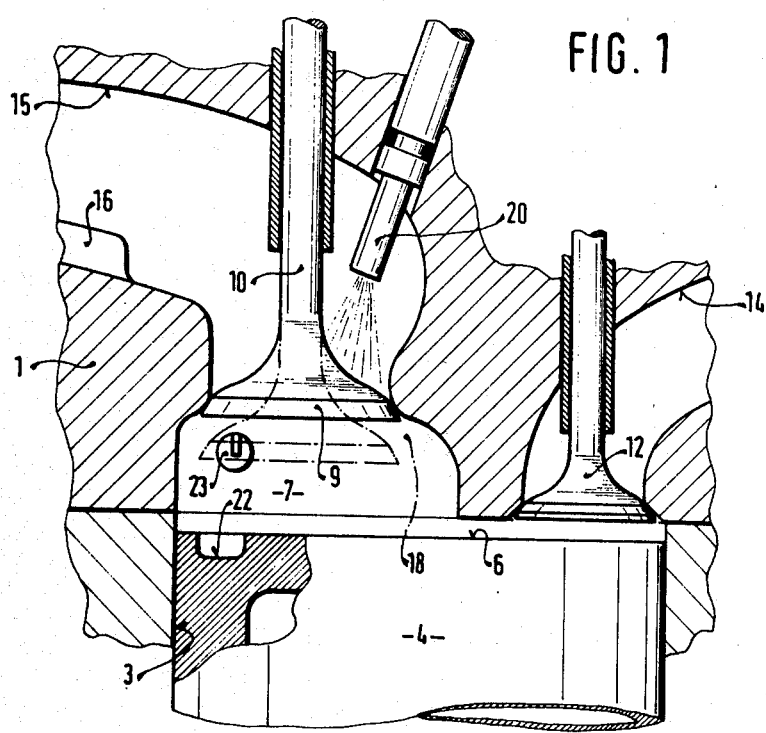
FIG. 1 is a longitudinal section taken through a portion of the cylinder head in the cylinder of an internal combustion engine.
Figure 2:
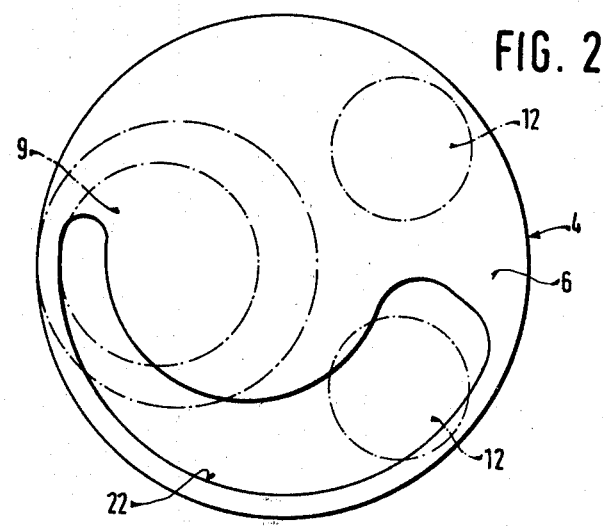
FIG. 2 is a plan view of the piston bottom of the exemplary embodiment of FIG. 1.

In the exemplary embodiment of FIG. 1, a portion of a cylinder head 1 is shown in a section which passes through the axis of the adjoining cylinder bore 3, through the axis of the inlet valve and through the axis of one of the outlet valves. The final compression volume of the combustion chamber is enclosed between the piston, which in the illustrated example is located in its top dead center position, and the cylinder head 1. The piston bottom 6 is substantially flat and in the cylinder head, in its top dead center position, the piston bottom 6 encloses a disc-shaped partial combustion chamber 7. In the present exemplary embodiment, this partial combustion chamber 7 is approximately circular and it represents virtually the entire final compression volume of the combustion chamber. This partial combustion chamber 7 is defined on one side by the piston bottom 6 already mentioned, and on the opposite side by the valve plate 9 of the single inlet valve 10. In this exemplary embodiment, as may be seen from FIG. 2, two outlet valves 12 are provided in addition to the inlet valve 10. In the conventional manner, an intake conduit 15 leads to the inlet valve 10 and the fresh air is supplied to the engine via this intake conduit 15. The exhaust gases, controlled by the outlet valve 12, are carried away via an outlet conduit 14. The intake conduit 15 is embodied in such a manner that a spin is imparted to the inflowing air so that a vortex is created in the partial combustion chamber which rotates about the axis of the parital combustion chamber. The spin-forming means of the intake conduit may be realized in a known manner and are not shown in detail here. For instance, guide faces 16 could be provided, or the conduit could be embodied in helical form.

In order to reinforce the formation of a vortex in the partial combustion chamber 7, the inlet valve 10 is also disposed eccentrically relative to the axis of the partial combustion chamber 7. The diameter of the inlet valve 10 is selected to be such, in proportion to the diameter of the partial combustion chamber, that the annular gap 18 which is created when the valve is in its open position is so large that there is no excessive throttling of the aspirated air.

Directly upstream of the valve plate 9, an injection nozzle 20 protrudes into the intake conduit and is directed such that the ejected fuel, when the inlet valve 10 is opened, proceeds unhindered through the annular gap 18 and directly into the partial combustion chamber 7. The injection nozzle may be embodied as a multiple-aperture injection nozzle. However, it is most advantageous to use an injection nozzle which ejects a conical stream, thus guaranteeing rapid and high-quality preparation of the injected fuel.

In order to reinforce the spin formation in the partial combustion chamber 7, a gas guidance conduit 22 is further machined into the top face of the piston in accordance with the invention. This gas guidance conduit 22 begins in the region opposite one of the outlet valves 12 and leads into the region of the partial combustion 7, following the circumference of the piston. The width of the conduit is continuously reduced, while its depth increases. Thus, the cross-section of the conduit varies from a very narrow, stretched-out shape to a virtually square, round or trapezoidal shape at the entrance into the partial combustion chamber 7. The conduit is extended somewhat further at that point, in the direction of the intended vortex flow, and then extends flat. The gas guidance conduit 22 has the purpose of receiving the squeeze flow which occurs during the compression stroke of the piston and introducing this squeeze flow, in a guided and compact manner, into the partial combustion chamber 7. The gas guidance conduit also reinforces the spin-forming effect of the shaping of the intake tube and the eccentric position of the inlet valve 10.

The apparatus according to the invention functions in the following manner:

After the termination of the expulsion stroke of the internal combustion engine, which in this case is a four-cycle engine with externally-supplied ignition, fresh air is aspirated near the intake conduit 15 during the downward stroke of the piston 4, with the inlet valve 10 opened, in a manner such that a well-defined, directed vortex flow occurs in the partial combustion 7 about the middle of the disc-shaped partial combustion chamber. Toward the end of the aspiration stroke, the injection of the fuel to be metered is effected in a controlled fashion through the injection valve 20 as described above. The length and the angle of the injection stream or streams are dimensioned such that there is as little wetting of the combustion chamber wall as possible. This is easily attainable if the fuel injection streams are directed straight into the combustion chamber, which now no longer varies substantially in shape, in contrast to other known methods where the combustion chamber is located, for instance, in the piston.

The period of time during which injection takes place is as close as possible before the closing of the inlet valve, so as to prevent the fuel from being carried far into the cylinder chamber, which at this instant is still enlarged by the amount of the stroke volume. During the subsequent compression stroke, the fuel quantity which has been injected shortly before remains inside the partial combustion chamber and is thus capable of being distributed uniformly over the circumference in the rotating air vortex, so that the result is a well-prepared fuel-air mixture which is readily capable of igniting.

As a result of the disposition of the gas guidance conduit 22, according to the invention, the spin formation in the partial combustion chamber 7 is substantially reinforced, so that it is possible in some circumstances to omit spin-forming means in the intake tube. These spin-forming means in the intake tube have a much lesser influence on the intensity of the spin resulting at the end of the compression stroke and furthermore have the disadvantage that they throttle the aspirated air, thus causing poorer filling of the combustion chamber. On the other hand, the intense spin movement causes a substantial improvement in the readiness to ignite and to combust completely of a relatively lean fuel-air mixture.

At the same time, the conditions for creating and maintaining a layering of a mixture, in the region of the ignition location, which is fuel-rich and capable of ignition on the one hand and on the other hand is low in fuel or is a pure air change, are improved. The ignition location may be disposed in the form of a spark plug 23, for instance, in the side wall of the partial combustion chamber near the inlet valve. The course of the gas guidance conduit, which begins in the region of one of the outlet valves, has the further advantage that the squeeze flow caused between the piston bottom and the portion of the cylinder head on the side of the outlet valve is carried by way of the hot outlet valve, so that the air flow is heated even more intensely than usual. The ignitability of the charge is thereby improved. The variation of the gas guidance conduit cross-section from a flat, extended shape to a virtually square shape at the entrance into the partial combustion chamber causes an extreme compactness of the air flow with a high energy content, which contributes to the spin formation.

In the illustrated embodiment, the gas guidance conduit is created in the top face of the piston. However, it is also possible to provide a gas guidance conduit 22 in the cylinder head as well, as shown in FIG. 3.

Figure 3:
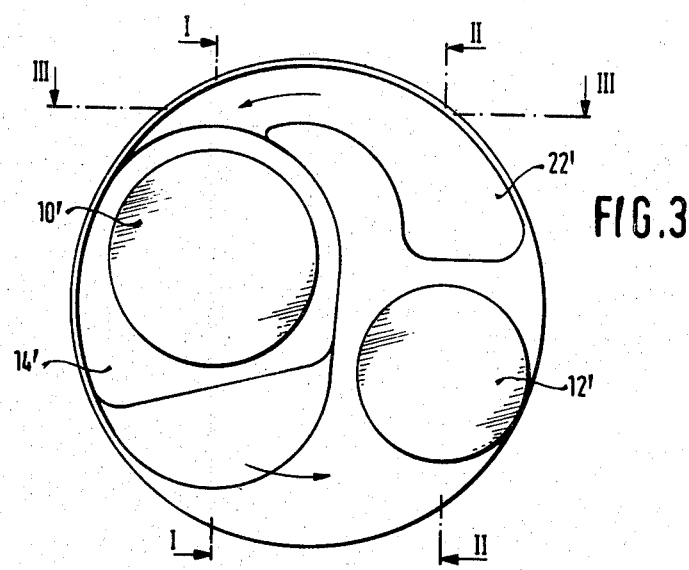
FIG. 3 is a plan view of the cylinder head of a second exemplary embodiment of the invention, viewed from the direction of the piston bottom.

Referring now to FIG. 3 this is a view looking up into the cylinder head, as viewed from the face of the piston. In this exemplary embodiment, only one outlet valve 12' is provided. The gas guidance conduit 22' begins next to this outlet valve 12', here having an extended, flat cross-section. The gas guidance conduit follows the circumferential circle of the piston and leads, tangentially, into the partial combustion chamber 14', the width of the gas guidance conduit 22' being continuously reduced and the depth being continuously increased. The partial combustion chamber 14' has the general shape of an oval, with the inlet valve 10' disposed eccentrically thereto. The increase in surface area has the advantage that when the inlet valve is opened, the aspirated air quantity can reach the combustion chamber with reduced transfer losses. The eccentric position of the inlet valve, in turn, causes the formation of a spin which is reinforced by the air flow in the gas guidance conduit 22' in the same manner as in the first exemplary embodiment. Corresponding to the larger cross-section of the partial combustion chamber 14', the height of this partial combustion chamber is reduced, which may be seen from FIG. 4.

Figure 4:
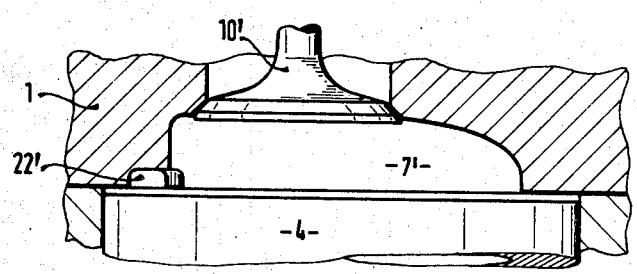
FIG. 4 is a first partial section along the line of I—I through the cylinder head in accordance with the exemplary embodiment shown in FIG. 3.

FIG. 4 is a section taken through the cylinder head along the line I—I of FIG. 3. It will be seen that the gas guidance conduit 22' has a virtually square form at its point of discharge into the partial combustion chamber 14'.

Figure 5:
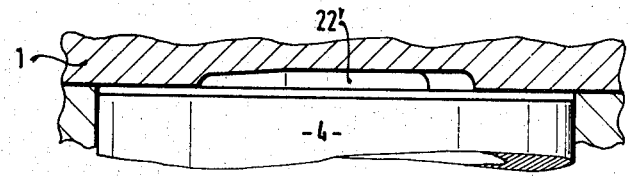
FIG. 5 is a second partial section II—II taken through the cylinder head in accordance with the exemplary embodiment of FIG. 3.
Figure 6:
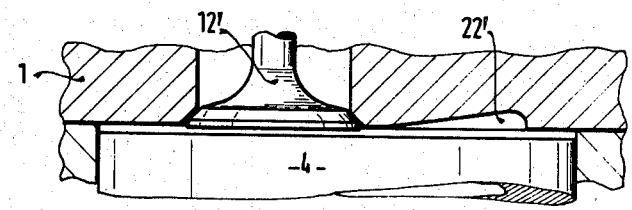
FIG. 6 is a third partial section III—III thorugh the cylinder head of the exemplary embodiment according to FIG. 3.

Referring again to FIG. 3 the views III—III and II—II of that figure and which are shown in FIGS. 5 and 6, respectively, reveal the gradual flattening of the gas guidance conduit 22' about its initial point beside the outlet guide 12'.

In this exemplary embodiment as well, the advantages described for the foregoing embodiment again occur. As a result of the flattening of the partial combustion chamber, it is furthermore possible to increase the intensity of the vortex thus created, and to keep the intake losses lower. The spin-forming means of the intake conduit may be omitted here, because of the intensely embodied squeeze flow.

The solutions in accordance with the invention described above enable the operation of an internal combustion engine at good efficiency with a greatly leaneddown fuel-air mixture, and the limit of the compression ratio at which knock-free operation is still possible can be lowered. In order to observe exhaust emission regulations, the invention also provides every possibility of further improving the exhaust composition. In particular, the high speed of complete combustion in this embodiment permits the increased recirculation of exhaust gas, which in particular enables the reduction of $NO_x$ emission. High exhaust recirculation rates may furthermore also be used to control the output produced by the internal combustion engine by replacing a portion of the charge with recirculated exhaust gas, instead of by throttling the aspirated air.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A piston-type internal combustion engine comprising at least one cylinder head, an inlet valve plate and at least one outlet valve in said cylinder head, a disc shaped partial combustion chamber disposed in said cylinder head, at least one piston having an annular body and further including a substantially flat bottom surface and when positioned at top dead center forms one surface which substantially encloses said disc-shaped partial combustion chamber disposed in said cylinder head, this partial combustion chamber having the predominant volumetric component of the final compression volume, said combustion chamber being closable by said inlet valve plate, an intake conduit arranged for communication with said combustion chamber when said intake valve plate is opened, a fuel injection nozzle directed toward said inlet valve plate and disposed so that fuel is injected virtually freely into said combustion chamber when said intake valve plate is opened and the injection duration of said fuel is interrupted immediately prior to closure of said inlet valve, characterized in that a gas guidance conduit is provided between said surface of said piston and said cylinder head, said guidance conduit further having a cross-section which gradually varies from a zone which is substantially flat beginning in the region of said outlet valve and extends approximately in the form of a semicircle in a direction parallel to said surface of said piston to thereby create the formation of a compact gas stream for entry into said partial combustion chamber.

2. A piston-type internal combustion engine as defined by claim 1, characterized in that said gas guidance conduit is recessed in said piston bottom.

3. A piston-type internal combustion engine as defined by claim 1, characterized in that said gas guidance conduit extends further into a portion of the combustion chamber and exits there, adapting itself to the shape of a limiting wall of said partial combustion chamber.

4. A piston-type internal combustion engine as defined by claim 1, characterized in that an aspirated air supply into said combustion chamber is provided with a spin.

5. A piston-type internal combustion engine as defined by claim 1, characterized in that the fuel injection nozzle is embodied as a conical stream nozzle.

6. A piston-type internal combustion engine as defined by claim 1, characterized in that said partial combustion chamber has a central axis and said inlet valve plate is disposed eccentrically relative thereto.

7. A piston-type internal combustion engine as defined by claim 1, characterized in that said outlet valve together with said partial combustion chamber and said gas guidance conduit are disposed within the confines of said annular body of said piston.

* * * * *